(12) United States Patent
Young et al.

(10) Patent No.: US 6,461,766 B1
(45) Date of Patent: Oct. 8, 2002

(54) HYDROGEN STORAGE POWDER AND PROCESS FOR PREPARING THE SAME

(75) Inventors: Kwo Young, Troy, MI (US); Michael A. Fetcenko, Rochester Hills, MI (US); Stanford R. Ovshinsky, Bloomfield Hills, MI (US)

(73) Assignee: Ovonic Battery Company, Inc., Troy, MI (US)

( * ) Notice: Subject to any disclaimer, the term of this patent is extended or adjusted under 35 U.S.C. 154(b) by 0 days.

(21) Appl. No.: 09/575,313

(22) Filed: May 19, 2000

Related U.S. Application Data

(63) Continuation-in-part of application No. 09/141,668, filed on Aug. 27, 1998.

(51) Int. Cl.⁷ .......................... H01M 4/52; H01M 4/58
(52) U.S. Cl. .................. 429/218.2; 205/413; 241/16
(58) Field of Search ........................ 429/218.1, 218.2

(56) References Cited

U.S. PATENT DOCUMENTS

| | | | | |
|---|---|---|---|---|
| 4,551,400 A | * | 11/1985 | Sapru | 429/94 |
| 4,623,597 A | * | 11/1986 | Sapru | 429/101 |
| 4,728,586 A | * | 3/1988 | Venkatesan | 429/94 |
| 4,893,756 A | | 1/1990 | Fetcenko et al. | 241/33 |
| 4,923,770 A | * | 5/1990 | Grasselli | 429/101 |
| 5,185,221 A | * | 2/1993 | Rampel | 429/59 |
| 5,500,309 A | * | 3/1996 | Lichtenberg | 429/223 |
| 5,775,602 A | * | 7/1998 | Furukawa | 241/16 |
| 6,040,087 A | * | 3/2000 | Kawakami | 429/218.1 |
| 6,120,936 A | * | 9/2000 | Young | 429/218.2 |
| 6,329,101 B1 | * | 12/2001 | Kawakami | 429/218.2 |

FOREIGN PATENT DOCUMENTS

| | | | | |
|---|---|---|---|---|
| JP | 62167201 | * | 7/1987 | B01D/53/14 |
| JP | 10195575 A | * | 7/1998 | C22C/22/00 |
| WO | WO 9527315 | * | 10/1995 | H01M/4/24 |

* cited by examiner

*Primary Examiner*—Patrick Ryan
*Assistant Examiner*—Mark Ruthkosky
(74) *Attorney, Agent, or Firm*—Dean B. Watson; Marvin S. Siskind

(57) ABSTRACT

An anti-pyrophoric hydrogen storage material having an engineered surface oxide to enhance initial activation and a method for making the same. The method for making. the hydrogen storage material includes the steps of providing a hydrogen storage powder and oxidizing the powder with a controlled oxidation reaction. In a preferred aspect hereof, the method includes providing a bulk hydrogen storage alloy; hydriding the alloy to form a comminuted material; and oxidizing the surface of the comminuted material with a controlled oxidation reaction. In another preferred aspect hereof, a passivating material is added to the comminuted material prior to the step for oxidizing to enhance initial activation. In still another preferred aspect hereof, at least one sacrificial modifier is provided in the particalized material to enhance initial activation.

43 Claims, 5 Drawing Sheets

HYDROGEN STORAGE POWDER AND PROCESS FOR PREPARING THE SAME

REFERENCE TO RELATED APPLICATIONS

The present invention is a continuation in part of U.S. patent application Ser. No. 09/141,668, entitled "A Method For Powder Formation Of A Hydrogen Storage Alloy", filed Aug. 27, 1998, and U.S. patent application Ser. No. 09/290,633, entitled "Modified Electrochemical Hydrogen Storage Alloy Having Increased Capacity, Rate Capability and Catalytic Activity", filed Apr. 12, 1999, the disclosures of which are herein incorporated by reference.

BACKGROUND OF THE INVENTION

I. Field of the Invention

The present invention pertains to hydrogen storage powders and methods for making the same. More particularly, the present invention pertains to a method for making an electrochemical hydrogen storage powder with an engineered surface oxide to protect the powder from catching fire and to provide easier activation.

II. Description of the Related Art

Hydrogen storage materials have found use in various technologies, including battery electrode materials, fuel cells, getters, heat pumps, and the storage of hydrogen gas. Hydrogen storage materials are materials capable of absorbing and desorbing hydrogen respectively. Examples of some hydrogen storage materials include: metallic elements, such as Mg, Ti, V, Nb, Pd, and La, and some intermetallic alloys, such as TiFe, $Mg_2Ni$, MgNi, misch metal based $AB_5$, and Laves phase based $AB_2$. It is generally practiced when making hydrogen storage materials to form the hydrogen storage material into a porous substructure to take advantage of high surface reaction area. A porous substructure is typically formed by powderizing a hydrogen storage material, forming the powderized material into a composite body with a suitable substrate material and subjecting the composite body to one or more pretreatment steps or 'activation'. Formation of a powdered material followed by pretreatment increases surface area, active sites, and porosity among other characteristics of the hydrogen storage material.

Powderized hydrogen storage material is particularly useful in the formation of battery electrodes. Methods for making powderized hydrogen storage materials and battery electrodes therefrom are generally known and have been described in a number of patents, including for example, U.S. Pat. Nos. 4,716,088; 4,670,214; 4,765,598; 4,820,481; and 4,915,898, the disclosures of which are herein incorporated by reference. Methods for making metal hydride battery electrodes typically include applying and fixing a pulverized hydrogen storage material to a conductive substrate. A number of additives may also be added to the powder to increase cohesion to the conductive substrate and to improve battery performance. Such additives may include binders and conductive filler.

Hydrogen storage materials may be powderized by a number of methods. The particular method to be used depends upon the material's composition, hardness, tendency to form surface oxides, and desired end use. Known powderization techniques include mechanical and chemical methods of pulverization and combinations thereof, including machining, milling, shooting, granulization, atomizing, condensation, reduction, chemical precipitation, or electrodeposition. Additionally or alternatively, other conventional size reduction techniques may be used, including, abrasion, shearing, ball milling, hammer milling, shredders, fluid energy, and disk attrition. To obtain useful particle size distributions or classification, pulverization is typically followed by sieving. Other techniques which do not necessarily require pulverization involve rapid quench methods such as jet casting and gas atomization.

While certain size reduction techniques work well for some materials, there is no single technique that works for all materials. For instance some materials are soft enough to crush using only mechanical crushing methods. Some materials are best suited for a combination of mechanical and chemical pulverization methods. Other alloys are too hard for mechanical crushing and must be pulverized by chemical methods. As such, many mechanical sizing techniques are not effective for pulverizing very hard materials, particularly those having a Rockwell hardness of greater than 45.

Bulk hydrogen storage material is typically formed by melting various metals together and casting them in the form of a button or ingot. Bulk hydrogen storage material may be compositionally and structurally ordered, disordered or anywhere in between. As reported in *A Nickel Metal Hydride Battery for Electric Vehicles*, by S. R. Ovshinsky, M. A. Fetcenko and J. Ross, Science, Vol. 260, Apr. 9, 1993: "Among the elements that have become available for alloy formation in disordered electrode materials are Li, C, Mg, Al, Si, Ca, Ti, V, Cr, Mn, Fe, Co, Ni, Cu, Y, Zr, Nb, Mo, Sn, La, W, and Re. The list contains elements that can increase the number of hydrogen atoms stored per metal atom (Mg, Ti, V, Zr, Nb, and La). Other elements allow the adjustment of the metal-hydrogen bond strength (V, Mn, and Zr) or provide catalytic properties to ensure sufficient charge and discharge reaction rates and gas recombination (Al, Mn, Co, Fe, and Ni); or impart desirable surface properties such as oxidation and corrosion resistance, improved porosity, and ionic conductivity (Cr, Mo and W). The wide range of physical properties that can be produced in these alloys allows the MH battery performance to be optimized."

Order and Disorder form a spectrum and may be engineered into hydrogen storage materials to improve the above mentioned characteristics and others. The amount of structural and compositional order may be both material and process dependent. For example, more highly ordered materials may be formed by a conventional melt-and-cast. A slow cooling process allows crystal growth and substantial structural order to take place depending on the chemical formula. Highly disordered materials, on the other hand, are typically formed by melting with rapid quench, fast cooling methods. Rapid cooling provides a more highly disordered material, also dependant on the chemical constituents.

One successful method of pulverizing hydrogen storage alloy using hydrogen pulverization was developed at Ovonic Battery, Inc., the method of which is disclosed in U.S. Pat. No. 4,893,756, issued Jan. 16, 1990 to Fetcenko et al., and is entitled "Hydride Reactor Apparatus for Hydrogen Commination of Metal Hydride Hydrogen Storage Material", the disclosure of which is herein incorporated by reference. Through continuous and ongoing research endeavors, Ovonic Battery, Inc. developed the first hydrogen storage reactor for pulverizing hard, hydrogen storage materials for use in negative electrodes for batteries. The method has paved the way for the development of new materials with improved characteristics for the formation of battery electrodes.

According to Fetcenko et al., hydrogen storage powders may be made from a bulk material, such as a metal ingot or alloy by hydride/dehydride cycling comminution. The hydride/dehydride process reduces a metal hydride or hydrogen storage material from a large ingot or bulk size to particles. To accomplish the aforementioned comminution, bulk material is placed in a stationary hydrogen reactor. The reactor is placed under vacuum and purged with argon to remove any residual air. Hydrogen is then back-filled into the reaction chamber to a pressure of at least 25 psi. The hydrogen is absorbed in the hydrogen storage material, which thereby causes volumetric expansion of the metal lattices to comminute the hydrogen storage material. Hydrogenation may take several hours and may reach elevated temperatures. Cooling is provided to maintain the reaction vessel at a temperature of less than about 100° C. After hydrogenation, the comminuted material is dehydrogenated to remove hydrogen from the hydrogen storage material. The material may then be packaged under an oxygen free atmosphere for later formation into a battery electrode.

The Fetcenko patent and its progenies teach methods of hydrogen pulverization wherein the hydrogenation step is pressure controlled. Unfortunately, a pressure-controlled reaction may result in excessive heating of the hydrogen storage material. Excessive heating is undesirable in that it may cause unpredictable changes to the compositional and structural order or disorder of the hydrogen storage material. Additionally, excessive heating results in a long cooling period and increased production time.

Exposure of hydrogen storage materials to air can produce unpredictable and variable oxide formation on a significant portion of the particles. Uncontrolled or uneven oxidation of hydrogen storage materials typically results in an undesirably thick, dense and non-uniform oxide formation on the surface of the material, which makes activativation difficult. The resulting surface conditions render the surface unusable for immediate use as a negative electrode material for a battery. For example, a thick oxide layer hinders initial activation of the electrode by acting as an insulative barrier. An insulative barrier can interfere with electrochemical kinetics and transport processes that take place at the metal surface/electrolyte interface. Thus, manufacturing techniques for producing hydrogen storage powders with little or no oxide formation, such as packaging the powder under an oxygen free atmosphere, have been used. Yet, without an oxide surface layer, the hydrogen storage material is extremely pyrophoric due to the high heat of formation of metals such as La, Ce, Ti, V, Zr, Al with oxygen. Pyrophoric powders can react violently when exposed to air. Thus, pyrophoric materials pose a significant fire hazard in large scale manufacturing plants where safe working conditions are essential.

A number of methods have been evoked to overcome some of the problems associated with oxide formation on the hydrogen storage material. These methods focus almost exclusively on post powder formation by employing pretreatment steps or 'activation'. Activation, as used herein, specifically refers to treatment methods used to improve hydrogen transfer rate in an electrochemical hydrogen storage material after powder formation. For example, see U.S. Pat. No. 4,716,088, issued Dec. 29, 1987 to Reichman et al., which teaches a method for activating a rechargeable hydrogen storage, negative electrode, the disclosure of which is herein incorporated by reference.

Pretreatment methods work to activate the hydrogen storage material by improving, for example, surface area, porosity, and catalytic activity. Pretreatment methods primarily include electrical formation and etching. Electrical formation is defined as charge/discharge cycling required to bring the battery electrode up to its ultimate performance when inserted in a battery. For a number of alloys, electrical formation is essential for maximum battery performance at both high and low discharge rates. For instance, certain prior developed ViZrNiCrMn alloys require as many as 32 cycles of charge and discharge at various rates to fully activate an electric battery. It has been reported that this electrical formation causes expansion and contraction of the negative electrode alloy material as it alternately stores and releases hydrogen. This expansion and contraction induces stress and forms in-situ cracks within the alloy material. The cracking increases the surface area, lattice defects and porosity of the alloy material. Heretofore, NiMH battery electrodes have required this electrical formation step.

Electrical formation is material dependant, as different active hydrogen storage materials are prepared by various methods under distinct conditions, and formed into electrodes by several methods require different pretreatment steps. Hence, although no detailed method of electrical formation suitable for all electrodes can be described, electrical formation generally involves a relatively complex procedure of cycling the prepared battery through a number of charge/discharge cycles at varying rates and to varying depths.

Etching is also used to pretreat battery electrodes and is also material dependant. Etching, as defined herein, is chemical/thermal activation of the battery electrode material when treated with an etchant. Etching typically involves a relatively lengthy period of immersing the electrode in a concentrated alkaline or acidic solution. The degree and ease of etching is highly dependant on the chemical formula or composition of the material to be etched and the stability of the surface oxide. For example, alkaline solutions used to etch battery electrode materials include concentrated potassium hydroxide, sodium hydroxide, etc. Many etching methods require that the immersion take place at elevated temperatures. Additionally, etching often requires a long residence time. Although residence time depends on temperature and concentration, it is typically on the order of hours to a few days.

At present, in situ activation of electrodes in the battery is impractical due to the extreme conditions required for activation. For example, one problem of in situ activation is that separators used within batteries are sensitive to the elevated temperatures of greater that 60° C., which are normally used for activation. Another problem is that conventional etching typically requires a high concentration of KOH where batteries tend to have a much lower concentration of KOH. Thus, present day activation is not preformed in situ.

The impact of pretreatment or activation on manufacturing decisions can particularly be seen between the commercial advantages of two popular battery electrode materials, Laves based $AB_2$ and misch metal based $AB_5$ materials. $AB_2$ and $AB_5$ hydrogen storage alloys are. generally known. $AB_2$ materials include various Ti, V, Ni, Cr, Mg and Zr alloys belonging to the laves phase of intermetallic compounds and generally having a hexagonally symmetric C14 and cubically symmetric C15 structures. $AB_5$ alloys differ in chemistry, microstructure and electrochemistry from $AB_2$ alloys. $AB_5$ materials include, for example, such alloys where A is selected from the group consisting of rare earth elements and B is selected from the group consisting of Ni, Cu, Co, Fe, Al, Si and Mn.

A number of differences exist between $AB_2$ and $AB_5$ hydrogen storage materials that make $AB_2$ alloys a preferred battery electrode material. A atoms in $AB_2$ alloys (Ti, Zr) have a lower atomic weight compared with the heavy rare earth A atoms of $AB_5$ alloys. A lower atomic weight results in $AB_2$ alloys having a higher gravimetric energy density than $AB_5$ alloys. There are also structural differences between $AB_2$ and $AB_5$ alloys. For example, $AB_2$ alloys have two basic structures (C14 and C15), while $AB_5$ materials have one basic structure ($CaCu_5$). The multiple structures of $AB_2$ alloys allow for a higher degree of obtainable disorder as compared with $AB_5$ alloys. The advantages of $AB_2$ over $AB_5$ alloys makes $AB_2$ materials a significantly better battery electrode material when higher capacity, energy density, rate, and cell life are compared.

Despite the fact that $AB_2$ alloys provide a superior battery electrode material, $AB_5$ materials tend to require less activation. Activation has been a long and persistent problem to commercial battery manufacturers. In particular, activation encumbers the manufacture with investments in specialized capital equipment in the form of battery chargers along with increased labor and utility cost for additional processing steps. These costs are significant and are typically passed on to consumers in the form of increased battery costs. On the other hand, some manufactures tend to favor battery materials, such as $AB_5$ alloys, that require less activation. Unfortunately, such materials, as explained above, tend to be inferior electrochemical, hydrogen storage materials in terms of hydrogen storage capacity, cycle life and increased power. As such, some manufacturers sacrifice the performance provided by $AB_2$ alloys by opting to use $AB_5$ alloys to increase manufacturing cycle time by reducing activation requirements. In either case, higher costs are passed on to consumers either in the form of inferior products that need more frequent replacement or in the form of higher production costs associated with activation.

As the demand for better batteries at lower costs continues, manufactures will seek to improve the quality of their products with reduced manufacturing cycle time but without reducing the safety of their operations. Therefore, there is presently a need for an electrochemical, hydrogen storage alloy having high capacity, energy density, rate, and cell life and a method for making the same, which can be safely manufactured on a large scale, but requires minimal activation.

SUMMARY OF THE INVENTION

The present invention, to address the above mentioned deficiencies and others provides a particalized, anti-pyrophoric hydrogen storage material having enhanced initial activation and a method for making the same. The method provides a unique surface or surface layer upon the particalized material, which requires reduced activation when formed into an electrochemical hydrogen storage electrode.

In a preferred aspect hereof, the present invention provides a process for making an $AB_2$, anti-pyrophoric, electrochemical hydrogen storage powder with a unique, oxidized surface layer having enhanced initial activation.

The present invention also provides a method for making a comminuted, hydrogen storage alloy having an average particle size of 100 μm or less from a high hardness, bulk hydrogen storage material without the need for mechanical pulverization.

Generally, the method of the present invention includes providing a particalized hydrogen storage alloy and oxidizing the particalized alloy with a controlled oxidation reaction. The method preferably includes agitating the particalized alloy during the oxidizing step. The method may begin by providing a bulk hydrogen storage material, then comminuting the bulk hydrogen storage material by hydrogen pulverization, dehydriding the comminuted material, and oxidizing the comminuted material with a controlled oxidation reaction to form an anti-pyrophoric, electrochemical hydrogen storage alloy having an average particle size of 100 μm or less without the need for mechanical pulverization.

In another aspect hereof the method includes a further step of adding a passivating material to the particalized alloy before oxidizing the mixture with a controlled oxidation reaction. The passivating material preferably becomes dispersed about the surface of the oxidized particles to form a protecting surface layer that reduces surface oxidation to enhance initial activation.

In still another aspect of the present invention, the method comprises a step of forming a hydrogen storage material with a sacrificial modifier, such as Al, Sn, or Co or a combination thereof, prior to powderizing the hydrogen storage material. The sacrificial modifier provides a hydrogen storage powder having enhanced initial activation.

For a more complete understanding of the present invention, reference is made to the following detailed description and accompanying drawings.

DETAILED DESCRIPTION OF THE PREFERRED EMBODIMENTS

Figure 3:
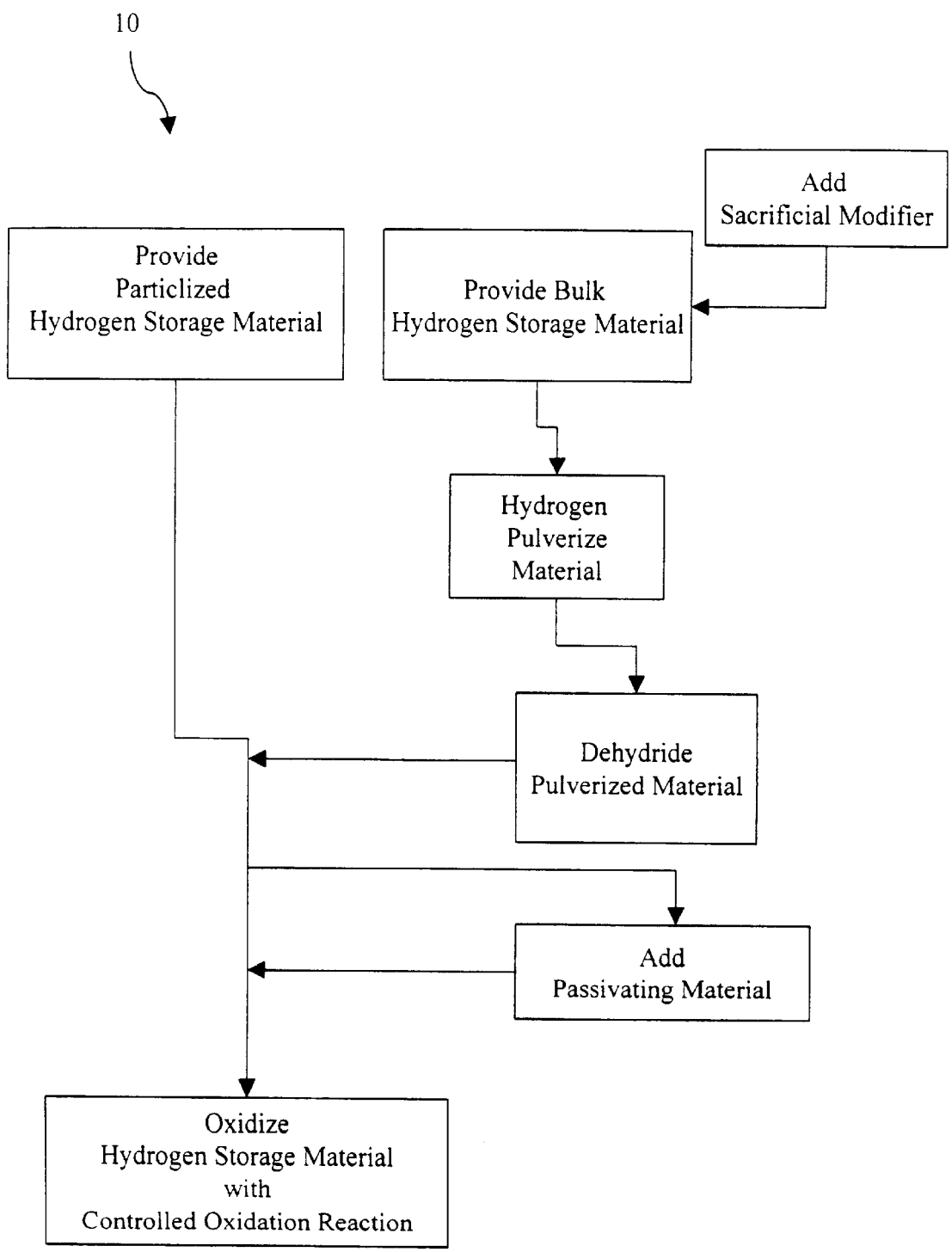
FIG. 3 is a flow diagram of a method for making a hydrogen storage material in accordance with the present invention.

With more particularity, and with reference to FIG. 3, therein is generally depicted at 10 a method for making a hydrogen storage powder having improved initial activation without the need for mechanical pulverization. The method generally includes the steps of providing a particalized hydrogen storage alloy and oxidizing the particalized alloy with a controlled oxidation reaction. In a preferred aspect hereof the particalized alloy is provided by comminuting a bulk hydrogen storage material by hydrogen pulverization.

The method includes providing a particalized hydrogen storage material or hydrogen storage powder. Although the present method is described with respect to pulverized hydrogen storage alloys formed from bulk materials, the present method may not be limited solely to hydrogen storage alloys pulverized from bulk materials, but may also find application with particalized alloys from other methods, including melt/cast particlization or high speed melt/cast methods, such as jet casting, gas atomization, etc. Preferably, the particalized hydrogen storage material is provided from an initial bulk hydrogen storage material. The bulk hydrogen storage material may be any suitable alloy having a predetermined compositional and structural formulation. Compositional and structural formulation may be determined according to desired end use. Examples of hydrogen storage materials applicable to the present invention include those described in U.S. Pat. Nos. 4,431,561; 4,832,913; 5,506,069; 5,616,432; 5,616,432; 5,554,456; 5,840,440; 5,536,591; and co-pending prior filed U.S. patent application Ser. No. 09/290.633, now U.S. Pat. No. 6,270,719, the disclosures of which are herein incorporated by reference. The method of the present invention is particularly useful for high hardness, electrochemical hydrogen storage alloys, where mechanical pulverization techniques alone are unsuitable to adequately particalize high hardness materials. As defined throughout the present specification, high hardness materials are materials having a Rockwell hardness of greater than 45. The bulk material is preferably an $AB_2$, high hardness, electrochemical, hydrogen storage material including one or more elements selected from the group consisting of Ti, V, Ni, Cr, Mg and Zr. The bulk material may also be a modified ViZrNiCrCoMn alloy.

Bulk hydrogen storage materials may be formed by combining metals of known composition and purity into an alloy. The metals may be combined by any suitable technique, including melting, resistively melting, induction melting, arc melting, etc. The melted material may be combined to form alloys having varying degrees of order and disorder, including, amorphous, crystalline, polycrystalline, microcrystalline, combinations thereof, etc. The melted material is cooled into a solid, bulk material, preferably having a size suitable for convenient handling. See for example, U.S. Pat. No. 4,948,423 issued to Fetcenko et al. and U.S. Pat. No. 5,002,730, the patents of which disclose alloy preparation of hydrogen storage materials, the disclosures of which are herein incorporated by reference.

For example, bulk material or alloy may be formed by induction melting under an argon atmosphere with commercially available raw materials. The melt size may range from 1 kg to 2000 kg depending upon the crucible size used. After reaching a temperature of 1600° C., the melt is held at that temperature for 20 minutes to homogenize it. Afterwards, the liquid is cooled down to 1300° C. and tilt-poured into a carbon steel mold. The solid material then cools in the form of an ingot, button or other shaped bulk material of a size and weight suitable for inserting into a hydride or hydrogen reactor for hydrogen pulverization.

Figure 1:
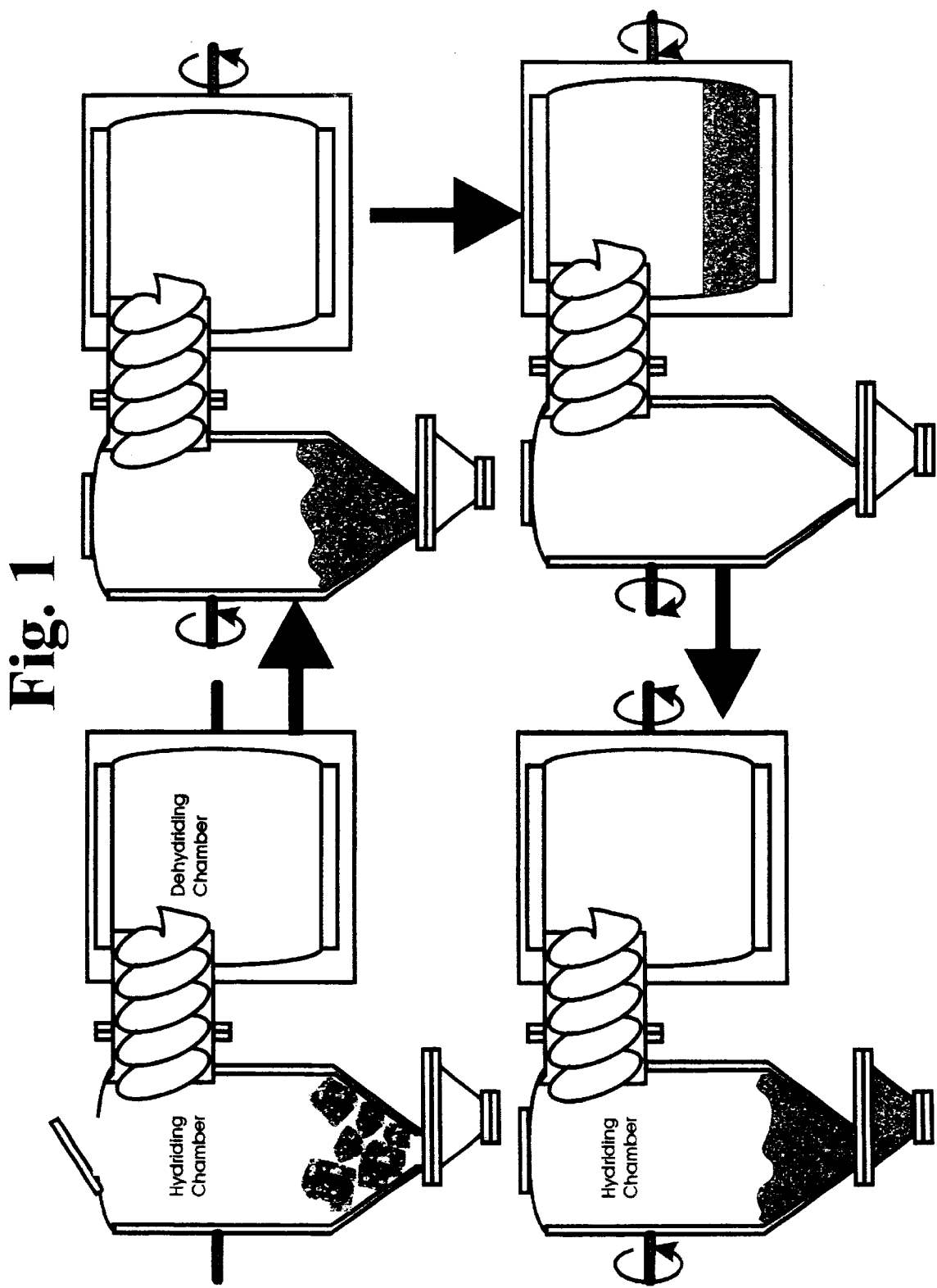
FIG. 1 is a schematic diagram of a rotary hydrogen reactor for providing a controlled oxidization reaction in accordance with the present invention.
Figure 2:
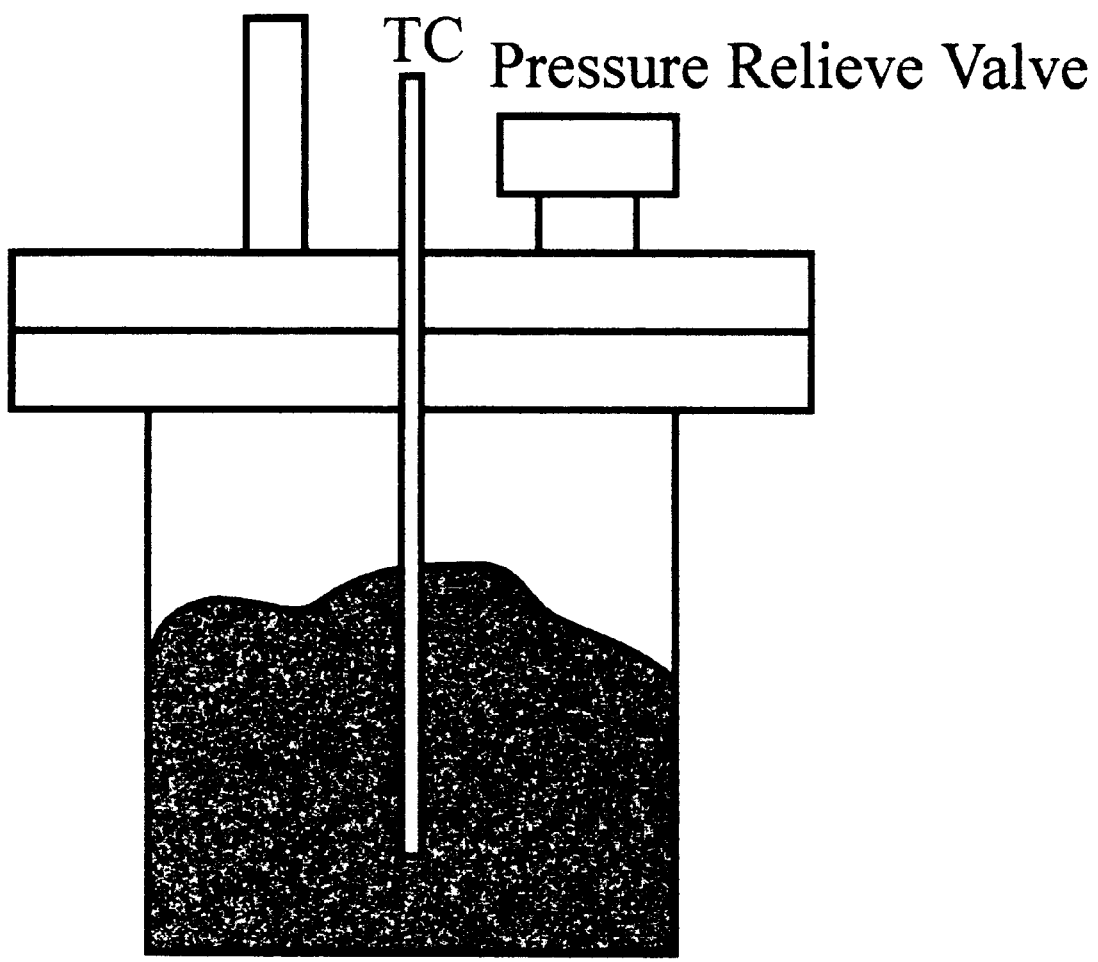
FIG. 2 is a schematic diagram of a stationary hydrogen reactor.

Hydrogen pulverization of bulk material is effected by inserting the bulk material into a multi or single chamber hydride reactor vessel, such as one shown in FIG. 1 or FIG. 2. The hydride reactor is preferably a hermetically sealable container capable of cooling, heating, gassing, out gassing and forming a vacuum. Prior to inserting the bulk material into the hydride reactor, a reactive or fresh surface is formed on the bulk material. The reactive surface may be formed by chiseling or scratching a portion of the bulk martial to expose a clean and reactive surface. The reactive surface provides a suitable site for hydrogen absorption and comminution to begin. Once the bulk material is inserted into the hydride reactor and the reactor is closed, the reactor is out-gassed to provide a substantial vacuum. The reactor may also be purged with argon to remove any residual moisture or oxygen.

To initiate comminution, hydrogen gas is pumped into the reactor at a controlled rate. The hydrogen gas may be pumped into the reactor vessel at either a constant or a variable rate to a predetermined pressure, hereinafter what is termed as pressure controlled. Alternatively and more preferably, the amount and the rate at which the hydrogen gas is fed into the reactor is made dependant upon the temperature of the hydriding, hydrogen storage material, herein after what is termed as temperature controlled. A temperature controlled hydriding process offers several advantages over a pressure controlled process, including improved process cycle time, avoiding unnecessary heating and maximizing the hydriding reaction and cooling rates. Thus, in the temperature controlled process, hydrogen gas is pumped into the reactor at a rate to initially raise the temperature of the hydrogen storage material to a predetermined temperature. The predetermined temperature is preferably a temperature that maximizes pulverization without excessive heating. For example, in an AB2-type alloy pulverization process, a preferred hydriding temperature is less than or equal to 75° C. Once the temperature of the hydrogen storage material or reactor reaches the desired hydriding temperature, hydrogen feeding is paused until the hydrogenation process begins to subside or the material cools to a second, lower, predetermined temperature. When the hydriding reaction begins to subside or the lower temperature is reached, the addition of hydrogen to the reactor is resumed to again bring the temperature to the first predetermined temperature. The heating cooling cycle provided by the hydriding and latent period is preferably set at about a 1° C. range. Hydriding the bulk material based on a 1° C. temperature fluctuation provides for accelerated comminution with little risk of compositional and structural modification to the hydrogen storage material.

Hydriding results in the bulk material being comminuted by expanding lattice structures upon the absorption of hydrogen. Hydrogen is pumped into the reactor according to the above process until the pressure of the hydrogen in the reaction vessel reaches about 2.5 atm or 35 psi and the temperature of the bulk material does not increase more than about 1° C. or less when hydrogen is added. Hydriding in accordance with the above procedure provides a hydrogen storage powder having an average particle size of 100 $\mu$m or less without the need for mechanical pulverization.

After the hydriding process is completed, the comminuted material or powder is then dehydrided. Dehydridng the powder removes absorbed hydrogen for safe material handling. Dehydriding the material is also necessary to prepare the powder for the controlled oxidization reaction or step. To dehydride the hydrogen storage powder, the reactor is preferably evacuated to remove all or almost all the excess and desorbable hydrogen. Preferably the vessel is evacuated to a pressure of less than about 1 torr. To increase the rate of the hydrogen desorption process, the material may also be heated to an elevated temperature suitable for driving off any residual hydrogen. Elevated temperatures preferably include those temperatures below which may adversely effect material compositional and structural chartacteristics. Elevated temperatures preferably fall in the range of about 200–400° C., but will vary depending upon the composition of the hydrogen storage material being dehydrided.

The dehydrided powder is processed with a controlled oxidation reaction or step. A controlled oxygen reaction provides an anti-pyrophoric material with an engineered surface layer having increased initial activation and reduced pretreatment requirements. The controlled oxidation reaction preferably provides a substantially uniform oxide or oxide layer formed about each particle of the hydrogen storage powder.

The controlled oxidation reaction includes exposing the hydrogen storage powder to an oxidant. The oxidant is preferably an oxidizing atmosphere. The oxidizing atmosphere preferably comprises at least one oxidizing gas, such as oxygen, carbon dioxide, carbon monoxide, nitrous oxide, etc. The oxidant may be provided in any suitable form but is preferably provided as an oxidizing gas mixture having at least one non-oxidizing gas, for example, 20% oxygen balanced with argon. The function of the non-oxidizing gas is to increase the thermal conductivity by gas convection, slow down the oxidation process, and provide a safer working environment. Suitable non-oxidizing gases include nitrogen, argon, helium, other inert gases, or a combination of the above. The oxidant is preferably present in the oxidizing gas mixture at a concentration of 1 percent by weight or greater, more preferably 5% or greater and may be as high as 30% by weight. A preferred oxidizing gas mixture has 20–30% by weight oxygen and 70% by weight or greater argon. The controlled oxidation reaction is preferably provided in a solvent free environment.

The oxidizing gas is pumped into the reactor at a rate and in a manner sufficient to oxidize the surface of the pulverized material in a controlled manner, e.g. a controlled oxidation reaction. The oxidation rate is preferably temperature controlled, as opposed to pressure controlled (see definition of temperature controlled above). For example, the oxidizing gas may be incrementally pumped into the reaction vessel until the temperature of the dehydrided powder reaches an upper predetermined temperature, such as 26° C. Once the powder reaches the upper predetermined temperature, the addition of the oxidizing gas is halted until the material begins to cool or cools to a lower predetermined temperature, such as 25° C. Preferably the cooling or temperature drop is greater than 0 to 5° C., preferable greater than 0 to 3° C., and more preferable 1° C. or less. The process of adding oxidant and cooling according to a predetermined temperature cycle of increases and decreases in temperature is repeated until the pressure of the gas in the vessel reaches about 1 atm or greater and the temperature of the material does not increase more than about 1° C. indicating that the surface of the hydrogen storage powder is otherwise preferentially oxidized.

In a preferred aspect hereof and to produce a unique, engineered surface layer by better thermal management of the powder, the hydrogen storage material is agitated during the controlled oxidation step to more uniformly oxidize the surfaces of the hydrogen storage particles. Agitation is any type of vigorous motion that exposes all or substantially all the surface area of each particle to the controlled oxidation reaction. Agitation may be accomplished by any suitable method, including mixing blades, stirring, augers, pitching, churning, tumbling, etc. Agitation is preferably provided by a hydride reaction vessel having a rotatable inner portion adapted to tumble the powder during the controlled oxidation reaction (see FIG. 1).

In practice, as the oxidizing gas is pumped into the reactor, the reactor rotates to tumble or churn the powder therein to more uniformly oxidize the surface of the hydrogen storage powder. The reactor can be a single chamber vessel (as in FIG. 2 for example), a two-chamber rotary vessel (as in FIG. 1), an in-line continuous rotary vessel or other multi-chambered vessel. Preferably, the reactor is a two-chamber rotary vessel having a cold chamber and a hot chamber, the hot chamber being linked to the cold chamber by an auger or reverse internal thread. After the material is oxidized, the material may be classified by any suitable sizing method, including sieving or the like.

In a preferred embodiment of the present invention, a passivating material is added to the particalized, hydrogen storage material after dehydriding but prior to oxidation. A passivating material provides a hydrogen storage material with improved initial activation and reduced pretreatment requirements. The passivating material may be any inert material that does not adversely interfere with the electrochemical functionality of the hydrogen storage alloy. The passivating material is preferably a fine powdered material or gel that may be added to the dehydrided powder as either a wet material or a dry material. The passivating material preferably adheres to or covers part of the surface of the hydrogen storage particles prior to oxidation to reduce surface oxidation and improve initial activation. The passivating material may be an alloy, a metallic fine powder or an inorganic layered compound. The passivating material may alternatively be an organic material, such as a polymer, PTFE, polyester, etc. If the passivating material is an organic compound, the compound is preferably hydrophobic. If the passivating material is an alloy, metallic fine powder, or inorganic compound, the passivating material preferably has at least one element selected from the group consisting of Cr, Fe, Co, Ni, Cu, Zn, Mo, Ta, and W. If the passivating material is an inorganic layered compound, the inorganic layered compound is preferably a sulfide having at least one element selected form the group consisting of Nb, Mo, Ta, and W, such as $MoS_2$, $WS_2$. After the passivating material is added to the hydrogen storage powder, the particles are oxidized in a controlled oxidation reaction as described above.

In another preferred embodiment of the present invention, the particalized hydrogen storage material may comprise one or more sacrificial modifiers. Sacrificial modifiers are modifiers that provide a surface having readily dissolvable portions when placed in a moderately low alkaline or moderately high acidic solution. Suitable sacrificial modifies include Al, Co, Sn, Fe, Li, K, Na, Sc, Y, and Mg either individually or in combination with one another. Sacrificial modifiers are preferably present in the hydrogen storage material at a concentration of 0.1 to 5.0 atomic percent or at an otherwise effective amount. Preferably, the sacrificial modifier is Al, Sn or Co present at a concentration of 0.5 to 3.0 atomic percent. Sacrificial modifiers are preferably added to the hydrogen storage material prior to particlization, such as by adding the modifiers to a molten hydrogen storage material before casting. Sacrificial modifiers provide enhanced initial activation with reduced pretreatment requirements. Sacrificial modifiers may also allow in situ activation of $AB_2$ hydrogen storage materials or in situ activation of VTiZrNiCrMn modified alloys.

EXAMPLES

CONTROL 1

Twenty kilograms of raw materials with a target composition of $Zr_{26.2}Ti_9V_5Ni_{38}Co_{1.5}Cr_{3.5}Mn_{15.6}Sn_{0.8}Al_{0.4}$ (all in atomic percentages) and a purity higher than 99% were mixed and loaded into a vacuum induction furnace, melted, and poured into a steel mold to form the ingot of this study. Co, Sn and Al were chosen as the sacrificial modifiers. Two kilograms of the ingot were placed in a hydrogen reactor (see FIG. 2). The rector was connected to a mechanical pump, pumped down to 50 microns and then back-filled with argon gas to one atmosphere. The evacuation and back-filling were repeated three times to ensure adequate removal of undesirable gases. After the last back-fill the reactor was pumped down to 10 microns vacuum and supplied with 35 psi of hydrogen gas (research grade). The temperature in the reactor was monitored through a thermocouple gauge. Temperature of the ingot increased during the first one hour of hydrogenation due to the exothermic nature of the hydrogen absorption reaction. The hydrogenation process was concluded when the temperature of the reactor dropped to room temperature. At this moment, the ingot was pulverized into powder with an average particle size of less than or equal to 100 microns). The temperature of the reactor was then elevated to 350° C. by an outside heater to remove hydrogen from the metal hydride powder. The dehydrogenation process was completed when the pressure in the reactor was less than 1 torr. The heater was turned off and the reactor was back-filled with one atmosphere of argon gas. The reactor was cooled to room temperature and the powder was removed from the vessel.

The such-obtained powder was placed on a copper block with a small indentation in the middle. A set of thermocouple wires were connected to the block to monitor the temperature. The block, together with the powder, was placed on a bench heater and heated at a rate about 10° C./min. The powder caught on fire at a block temperature of about 100° C. The above test demonstrates that the as-prepared powder is highly pyrophoric without an oxidation process and may pose a significant safety hazard during battery fabrication.

CONTROL 2

Two kilograms of sample were taken from the same ingot as described in Example 1. The sample was placed in the same hydrogen reactor (FIG. 2) and went through the same evacuation, hydride, dehydride process as in Example 1. After the sample was cooled to room temperature, instead of exposing the sample with air right away, a small amount of dry air was introduced to the reactor stepwise. Each step was 15 minutes apart and the pressure increase was limited to 1 psi at a time. Once the reactor pressure reached 1 atmosphere, a mechanical pump was used to pump the reactor down to 50 microns vacuum. This stepwise oxidation was repeated two additional times. The oxidized powder was taken out from the reactor and placed on a block as in Control 1. This time the powder did not catch fire until a block temperature of about 380° C. was reached, which was a successful demonstration of passivating the powder surface with a native oxide to remove the pyrophoric nature of the powder.

About 100 mg of the anti-pyrophoric powder was placed inside a steel die together with a 1 cm by 1 cm expanded Ni substrate under a 30 ton horizontal press to form a pressed electrode. The electrode was tested in a flooded electrochemical full cell configuration together with a partially precharged counter $Ni(OH)_2$ electrode and a 30% KOH electrolyte. The NiMH electrochemical cell was cycled under the following conditions: charged at a rate of 50 mA/g for 12 hours and followed by a discharge at a rate of 50 mA/g and cut off at a 0.9 volt cell voltage. The such-obtained discharge capacities are listed in Table 1 and depicted in FIG. 4.

Example 1

Two kilograms of sample were taken from the same ingot as prepared in Control 1. The sample was placed in the same hydrogen reactor (FIG. 2) and went through the same evacuation, hydride, dehydride process as Control 1. After the sample was cooled to room temperature, a constant flow of 5 ccm/s of dry air was introduced to the reactor until it reached 1 atmosphere and then evacuated by the pump immediately. This slow oxidation was repeated one more time. The such-oxidized powder was pulled out and made into electrode the same way and tested under the same flooded full-cell condition as described in Control 2. Example 1 resulted in improved activation over the Control 2.

Example 2

Two kilograms sample of the same ingot of the same ingot as prepared in Control 1 was placed in the same hydrogen reactor (FIG. 2) and went through the same evacuation, hydride, dehydride process as Control 2. After the sample was cooled to room temperature, the sample was taken through a controlled oxidation reaction using a flow of dry air introduced to the reactor and at a rate which kept the increase in the reactor temperature to about 1° C. or less. Once the reactor reached 1 atmosphere, it was evacuated by the pump immediately. This controlled oxidation was repeated one more time. The controlled oxidized powder was made into an electrode the same way and tested under the same flooded full-cell condition as described in Control 2. Example 2 resulted in improved ease of activation over Control 2.

Example 3

Example 3 was prepared in a manner similar to that of Example 1 except for the substitution of dry air with an 80% argon/20% oxygen mixture. The powder was made into electrode the same way as described in Control 2. The electrode was also tested under the same flooded full-cell condition as in Control 2 with the results listed in Table 1 and plotted in FIG. 4 to show comparison of improved activation provided by the controlled oxidation reaction.

TABLE I

Electrochemical discharge capacity during formation cycle (in mAh/g)

| Cycle # | Control 2 | Example 3 |
|---------|-----------|-----------|
| 1 | 151 | 310 |
| 2 | 349 | 364 |
| 3 | 366 | 368 |
| 4 | 373 | 364 |
| 5 | 372 | 360 |
| 6 | 372 | 366 |

Figure 4:
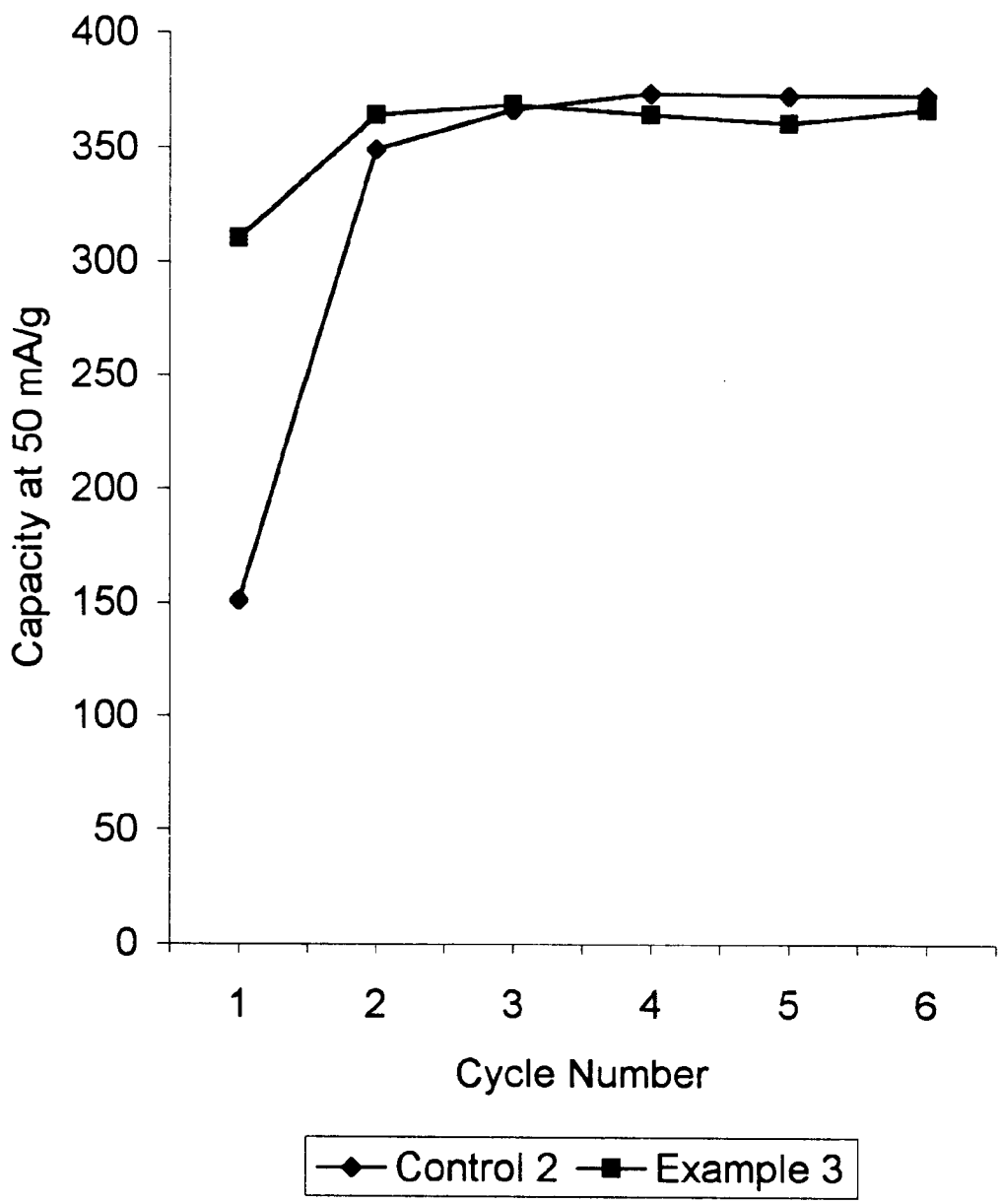
FIG. 4 is a chart comparing initial electrode activation of a control sample with an electrode having a hydrogen storage material prepared in accordance with the present invention.

The results are graphed in FIG. 4 and show that samples prepared in accordance with the present invention using a controlled oxidation reaction and having an engineered surface oxide have improved activation.

CONTROL 3

Figure 5:
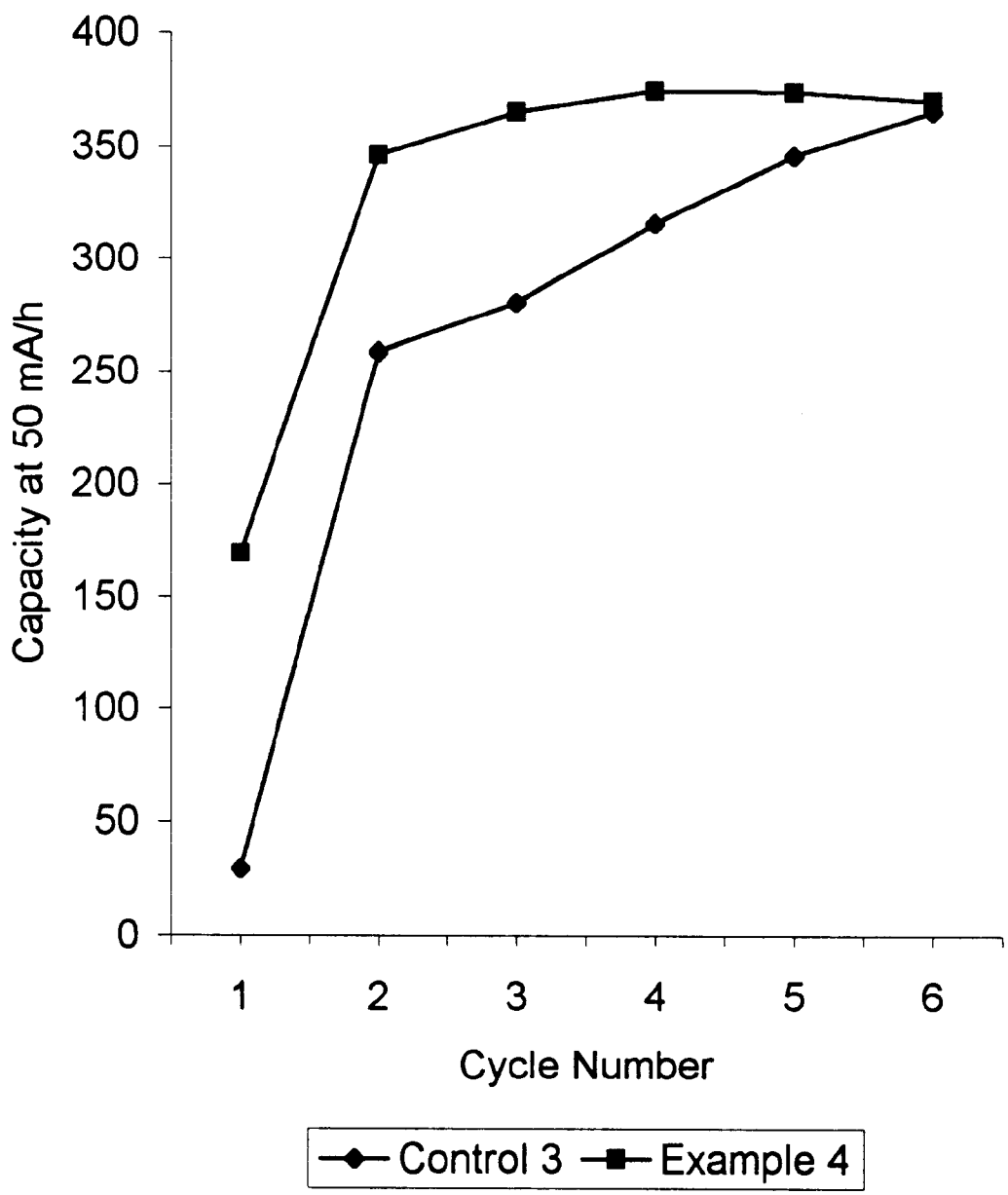
FIG. 5 is a chart comparing initial electrode activation of a control sample with an electrode having a hydrogen storage material prepared in accordance with the present invention.

Two hundred kilograms of raw materials with a target composition $Zr_{26.6}Ti_9V_5Ni_{38}Cr_5Mn_6Sn_{0.4}$ (all in atomic percentages) and purity higher than 99% were mixed and loaded into a vacuum induction furnace, melted, and poured into a steel mold to form the ingot of this study. Twenty kilograms of the ingot were placed in a scale-up hydrogen reactor from FIG. 2. The hydride/dehydride process was the same as Control 2. The discharge capacities are listed in Table II and plotted in FIG. 5. This alloy contained no Al and Co additive and was not treated with a controlled oxidation reaction. This material when tested was very slow to activate.

Example 4

A two-chamber rotary hydrogen reactor having a cooling chamber, a heating chamber and a reverse threat or screw operationally connecting the cooling chamber to the heating chamber was designed to scale up the controlled oxidation (for the schematic diagram of the two-chamber rotary hydrogen reactor, see FIG. 1). Although a stationary hydrogen reactor may be used, a stationary 20 kg hydrogen reactor may take as much as 15 hours or more to cool the fine metal powder to room temperature due to the poor heat conductance of the powder. The novel two chamber reactor of the present invention dramatically reduces process time and cooling.

Twenty kilograms of ingot from the same batch as Control 3 were put into the rotary hydrogen reactor. As can be seen from FIG. 1, the transferring direction of the powder along the screw depends upon the rotational direction of the reactor chambers. During the hydriding process, the cooling reactor was rotated in such as way that powder stayed in the cooling chamber for 3 hours. During dehydrogenation, the reactor was rotated in another direction to transfer the powder along the screw into the hot chamber. The powder was dehydrided for about 3 hours. At the end of dehydrogenation, the heating chamber was oppositely rotated to return the powder back to the cooling chamber for 1.5 hours of cooling. When the powder was cooled, the powder was put through three controlled oxidation cycles with 80%Ar/20% $O_2$, with temperature increases limited to about 1° C. The entire process time, including loading, took about 10.5 hours. The such-obtained powder was made into an electrode and tested under the same flooded, full cell configuration as in Control 3. The test results are listed in Table II and plotted in FIG. 5 for comparison purposes, showing that an electrode having hydrogen storage powder prepared with a controlled oxidation reaction using a multi-chamber rotary hydrogen reactor has improved initial activation.

Example 5

Another 20 kg ingot was put into the same two chamber rotary hydrogen reactor as Sample 2. In this experiment, the hydriding time was reduced from 2 hours to 1.1 hours and the dehydriding time was reduced from 3 to 1.6 hours. The cooling plus controlled oxidation cycle was reduced to 2.7 hours and included a relatively larger oxidant flow. The such-obtained powder was made into an electrode and tested under the same conditions as previously mentioned. The test results showed a marked improvement in ease of activation of the material undergoing the controlled oxidation reaction verses the control sample.

TABLE II

Electrochemical discharge capacity during formation cycle (in mAh/g

| Cycle # | Control 3 | Example 4 |
|---|---|---|
| 1 | 29 | 169 |
| 2 | 258 | 346 |
| 3 | 280 | 365 |
| 4 | 315 | 374 |
| 5 | 345 | 373 |
| 6 | 365 | 369 |

A particularly preferred hydrogen storage powder suitable for use in accordance with the present invention is the new and improved family of alloys disclosed in co-pending U.S. patent application Ser. No. 09/290,633 filed Apr. 12, 1999, the disclosure of which is herein incorporated by reference. Disclosed therein is a family of novel electrochemical hydrogen storage alloys comprising a base alloy and at least one modifying element, said base alloy consisting essentially of 0.1 to 60% Ti, 0.1 to 40% Zr, 0 to 60% V, 0.1 to 57% Ni, 5 to 22% Mn and 0 to 56% Cr. The modifier alloy is characterized by an increase charge/discharge rate capability over that of the base Ti—V—Zr—Ni—Mn—Cr electrochemical hydrogen storage alloy. The Ti—V—Zr—Ni—Mn—Cr electrochemical hydrogen storage alloy preferably includes one or more of the following: 0.1 to 10.0% Al, 0.1 to 10% Co, 0 to 3.5% Fe, and 0.1 to 3.0% Sn. The Ti—V—Zr—Ni—Mn—Cr may also include metallic catalytic particles.

While the invention has been illustrated in detail in the drawings and the foregoing description, the same is to be considered as illustrative and not restrictive in character, it is understood that only the preferred embodiments have been shown and described fully and that all changes and modifications that come within the spirit of the invention are desired to be protected.

What is claimed is:

1. A method for making a hydrogen storage material comprising the steps of:
   providing hydrogen storage powder; and
   oxidizng the hydrogen storage powder with a controlled oxidation reaction having a ΔT of 5° C. or less.

2. The method of claim 1 wherein the step for oxidizing includes agitating the hydrogen storage powder during the controlled oxidation reaction.

3. The method of claim 2 wherein the step for oxidizing is provided by an oxidizing atmosphere.

4. The method of claim 2 wherein the method further comprises a step of adding a passivating material to the hydrogen storage powder prior to the step for oxidizing.

5. The method of claim 2 wherein the hydrogen storage powder is an $AB_2$ hydrogen storage material having at least one element selected from the group consisting of V, Ti, Zr, Ni, Cr and Mn.

6. The method of claim 2 wherein agitating the hydrogen storage powder includes churning the powder to provide an anti-pyrophoric surface layer on each particle of the hydrogen storage powder.

7. The method of claim 2 wherein the step for oxidizing provides a substantially uniform oxide surface layer on at least one particle of the hydrogen storage powder.

8. The method of claim 2 wherein the hydrogen storage powder is an electrochemical hydrogen storage material.

9. The method of claim 2 wherein the hydrogen storage powder is a gas phase hydrogen storage material.

10. The method of claim 3 wherein the oxidizing atmosphere comprises at least one oxidizing gas and at least one non-oxidizing gas.

11. The method of claim 10 wherein the oxidizing gas includes $O_2$.

12. The method of claim 3 wherein the oxidizing atmosphere comprises greater than 10% by weight non-oxidizer and between 0.5% and less than 90% by weight oxidizer.

13. The method of claim 4 wherein the passivating material comprises at least one element selected from the group consisting of Cr, Fe, Co, Ni, Cu, Zn, Mo, Ta, and W.

14. The method of claim 4 wherein the passivating material is a hydrophobic organic compound.

15. The method of claim 4 wherein the passivating material is a layered sulfide compound having at least one element selected from the group consisting of Nb, Mo, Ta, and W.

16. The method of claim 2 wherein the hydrogen storage material comprises at least one sacrificial modifier.

17. The method of claim 16 wherein the sacrificial modifier comprises at least one element selected from the group consisting of Co, Al, Fe, Li, K, Na, Sc, Y, and Mg.

18. A method for making a hydrogen storage negative battery electrode material comprising the steps of:
   providing bulk hydrogen storage material,
   hydriding the bulk hydrogen storage material to form a powder; and
   oxidizing the hydrogen storage powder with a controlled oxidation reaction having a ΔT of 5° C. or less.

19. The method of claim 18 wherein the step for oxidizing includes agitating the hydrogen storage powder in an oxidizing atmosphere.

20. The method of claim 19 wherein agitating the hydrogen storage powder includes churning the powder to provide an anti-pyrophoric surface layer on each particle of the hydrogen storage powder.

21. The method of claim 19 wherein the method further comprises a step of adding a passivating material to the hydrogen storage powder prior to the step for oxidizing.

22. The method of claim 19 wherein the hydrogen storage powder is hydrogen storage alloy having at least one element selected from the group consisting of V, Ti, Zr, Ni, Cr and Mn.

23. The method of claim 19 wherein the step for oxidizing forms a substantially uniform oxide layer on at least one particle of the hydrogen storage powder.

24. The method of claim 19 wherein the oxidizing atmosphere comprises a mixture of at least one oxidizing gas and at least one non-oxidizing gas.

25. The method of claim 19 wherein the oxidizing atmosphere comprises greater than 10% by weight non-oxidizer and between 0.5% and less than 90% by weight oxidizer.

26. The method of claim 21 wherein the passivating material comprises at least one element selected from the group consisting of Cr, Fe, Co, Ni, Cu, Zn, Mo, Ta, and W.

27. The method of claim 21 wherein the passivating material is a hydrophobic organic compound.

28. The method of claim 21 wherein the passivating material is a layered sulfide compound having at least one element selected from the group consisting of Nb, Mo, Ta, and W.

29. The method of claim 19 wherein the hydrogen storage material comprises at least one sacrificial modifier.

30. The method of claim 29 wherein the sacrificial modifier comprises at least one element selected from the group consisting of Co, Al, Fe, Li, K, Na, Sc, Y, and Mg.

31. The method of claim 19 wherein the step for hydriding provides a hydrogen storage powder having an average particle size of 100μ or less without the need for mechanical pulverization.

32. A hydrogen storage material made by the process of claim 19.

33. The hydrogen storage material of claim 32 wherein the material further comprises a passivating material.

34. The hydrogen storage material of claim 33 wherein the material further comprises a sacrificial modifier.

35. The method of claim 1, wherein the hydrogen storage powder is provided at an initial temperature and the controlled oxidation reaction raises the temperature of the hydrogen storage powder by no more than 1° C. above said initial temperature.

36. The method of claim 18, wherein the hydrogen storage powder is provided at an initial temperature and the controlled oxidation reaction raises the temperature of the hydrogen storage powder by no more than 1° C. above said initial temperature.

37. The method of claim 36, wherein the hydrogen storage powder is cooled after the step for hydriding but before the step for oxidizing.

38. The method of claim 37, wherein the hydrogen storage powder is cooled to about ambient temperature before oxidizing.

39. The method of claim 38, wherein the hydrogen storage powder is cooled in a rotary chamber.

40. A method for making hydrogen storage material particles comprising the steps of:
   providing a hydrogen storage powder; and
   exposing the hydrogen storage powder to an oxidizer by adding the oxidizer to the hydrogen storage powder until the powder reaches a predetermined temperature, halting the addition of the oxidizer to control oxidation, and repeating the adding and halting until an oxide layer is formed on the powder particles.

41. The method of claim 40, wherein the powder is provided at an initial temperature just prior to oxidation and the predetermined temperature is 1° C. or less above said initial temperature.

42. The method of claim 40, wherein the step for exposing provides a ΔT of 5° C. or less.

43. The method of claim 40 wherein the hydrogen storage powder is provided by a process including hydriding at a temperature of 75° C. or less.

* * * * *